United States Patent
Hsieh et al.

(10) Patent No.: US 7,708,466 B2
(45) Date of Patent: May 4, 2010

(54) LUBRICATED BUSHING

(75) Inventors: Hsin-Mao Hsieh, Ping Tung (TW);
Wen-Lin Hsu, Pingtung Hsien (TW);
Wen-Jung Chien, Pingtung (TW)

(73) Assignee: ADDA Corp. (TW)

( * ) Notice: Subject to any disclaimer, the term of this patent is extended or adjusted under 35 U.S.C. 154(b) by 424 days.

(21) Appl. No.: 11/804,884

(22) Filed: May 21, 2007

(65) Prior Publication Data
US 2008/0292230 A1 Nov. 27, 2008

(51) Int. Cl.
*F16C 33/10* (2006.01)
(52) U.S. Cl. .................. 384/286; 384/291; 384/322
(58) Field of Classification Search ............ 384/118, 384/145, 276–275, 286, 291–293, 322, 484
See application file for complete search history.

(56) References Cited

U.S. PATENT DOCUMENTS

| | | | | |
|---|---|---|---|---|
| 1,386,962 A | * | 8/1921 | Sharp | 384/293 |
| 1,421,681 A | * | 7/1922 | Fuegel et al. | 384/291 |
| 1,885,646 A | * | 11/1932 | Warner | 464/136 |
| 3,133,769 A | * | 5/1964 | Drake | 384/145 |
| 3,499,183 A | * | 3/1970 | Parsons | 384/276 |
| 4,576,488 A | * | 3/1986 | Steiner et al. | 384/291 |
| 5,000,584 A | * | 3/1991 | Simmons | 384/118 |
| 5,094,548 A | * | 3/1992 | Danly, Sr. | 384/30 |
| 5,143,456 A | * | 9/1992 | Jordens et al. | 384/275 |
| 5,320,431 A | * | 6/1994 | Kallenberger | 384/322 |
| 5,463,795 A | * | 11/1995 | Carlson et al. | 16/273 |
| 5,562,293 A | * | 10/1996 | Bartusch | 277/345 |
| 5,577,844 A | * | 11/1996 | Stancescu | 384/513 |

FOREIGN PATENT DOCUMENTS

| | | | |
|---|---|---|---|
| EP | 307112 A2 | * | 3/1989 |
| EP | 381499 A2 | * | 8/1990 |
| JP | 53031208 A | * | 3/1978 |
| JP | 06147221 A | * | 5/1994 |
| JP | 2004322169 A | * | 11/2004 |
| WO | WO 02073052 A1 | * | 9/2002 |

* cited by examiner

*Primary Examiner*—Marcus Charles
(74) *Attorney, Agent, or Firm*—Jackson Walker, LLP

(57) ABSTRACT

A lubricated bushing is mounted in a mounting cavity in a bushing housing and has a body and a flange. The body has an axial hole formed coaxially through the body to rotatably hold a shaft of a rotor of a fan and a bottom concentric recess formed in a bottom end of the body. The flange is formed on and protrudes radially out from the outer wall of the body, is mounted against an inner wall of the mounting recess, extends longitudinally from the top end of body and is shorter than half the body. Even though the inner wall of the mounting cavity tightly compresses the flange, the compressive force cannot be effectively transmitted to the body to deform the axial hole, so the shaft is kept from seizing up in the axial hole.

4 Claims, 3 Drawing Sheets

LUBRICATED BUSHING

BACKGROUND OF THE INVENTION

1. Field of the Invention

The present invention relates to a lubricated bushing, and more particularly to a lubricated bushing that prevents a shaft mounted in the lubricated bushing from seizing up.

2. Description of the Prior Art

With reference to FIG. 6, a conventional lubricated bushing (30) is mounted in a mounting cavity in a bushing housing of a device such as a fan, rotatably holds a shaft and has a body (35) and a mounting sleeve (31).

The body (35) is cylindrical and has an axial hole (32), an outer end, an inner end and an outer wall. The axial hole (32) is formed coaxially through the body (35) and rotatably holds a shaft of a rotor of a fan and has an inner wall. The outer end of the body (35) has a concentric recess (38), multiple lubricant notches (36), an outer edge and an annular chamfer (37). The concentric recess (38) is formed in the outer end of the body (35) and communicates with the axial hole (32). The lubricant notches (36) are formed in the outer edge of the outer end of the body (35) at intervals and communicate with the concentric recess (38). When the shaft rotates, lubricant flows through the lubricant notches (36) and the concentric recess (38) into the axial hole (32) to lubricate the shaft. The lubricant reduces friction between the shaft and the inner wall of the axial hole (32), such that the shaft wears less and has a longer life. The annular chamfer (37) is formed on the outer edge of the outer end. The inner end of the body (35) is opposite to the first end.

The mounting sleeve (31) is longer than half the body (35), is formed around and protrudes from the outer wall of the body (35) of the lubricated bushing (30), is flush with the inner end of the body (35), abuts an inner wall of the mounting cavity in the bushing housing and allows lubricant to be stored in a gap between the body (35) and the mounting recess at the outer end of the body (35). The mounting sleeve (31) has two ends, an outer wall, two chamfers (33) and multiple lubricant grooves (34). The chamfers (33) are formed respectively on the ends of the mounting sleeve (31). The lubricant grooves (34) are formed longitudinally in the outer wall of the mounting sleeve (31), align respectively with the lubricant notches (36) and communicate with the end chamfers (33) on the ends of the mounting sleeve (31) to allow lubricant to flow to allow lubricant to circulate through the axial hole (32), concentric recess (38), lubricant notches (36) and lubricant grooves (34).

The conventional lubricated bushing (30) has a number of shortcomings. The shortcomings result in excessive operation noise, bearing seizing and limited lubrication capacity.

Squeezing the lubricated bushing (30) into a mounting cavity in a bushing housing compresses the mounting sleeve (31) somewhat, which easily deforms the axial hole (32) through the body (35) and causes the inner surface of the axial hole (32) to bind against the shaft mounted in the axial hole (32). This binding between the inner surface of the axial hole (32) and the shaft results in a loud noise when the shaft rotates and may cause the shaft seize up unexpectedly in the deformed axial hole (32).

Still further, because the lubricant grooves (34) respectively align with the lubricant notches (36), lubricant easily leaks out of the lubricated bushing (30) along the aligned lubricant notches (36) and lubricant grooves (34).

Additionally, the gap formed by the mounting sleeve (31) is limited to the outer end of the body (35), so only a limited amount of lubricant can be stored in the gap.

To overcome the shortcomings, the present invention provides a lubricated bushing to obviate or mitigate the aforementioned problems.

SUMMARY OF THE INVENTION

The primary objective of the present invention is to provide a lubricated bushing to mitigate or obviate the aforementioned problems of the conventional lubricated bushing.

The lubricated bushing in accordance with the present invention is mounted in a mounting cavity in a bushing housing and has a body and a flange. The body is cylindrical and has an axial hole, a top end, a bottom end, an outer wall a bottom concentric recess and multiple lubricant notches. The axial hole is formed coaxially through the body and rotatably holds a shaft of a rotor of a fan. The bottom concentric recess is formed in the bottom end of the body and communicates with the axial hole. The lubricant notches are formed in an outer edge of the bottom end of the body at intervals.

The flange is formed on and protrudes out from the outer wall of the body, extends longitudinally from the top end of body, is shorter than half the body, forms a top concentric recess communicating with the axial hole in the body and has a top end, an outer wall and multiple lubricant channels formed through the outer wall of the flange at intervals and offset relative to the lubricant notches. Even though the inner wall of the mounting cavity tightly compresses the flange, the compressive force cannot be effectively transmitted to the body to deform the axial hole, so the shaft is kept from seizing up in the axial hole.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
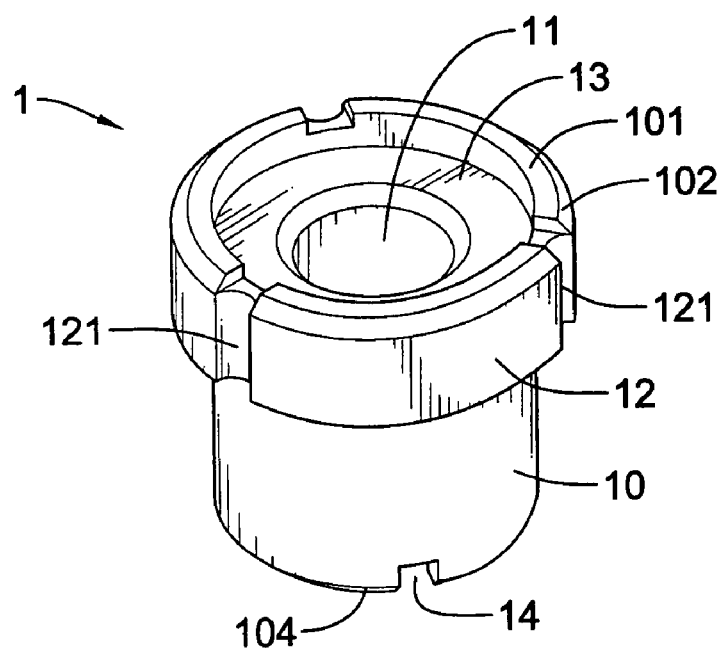
FIG. 1 is a perspective view of a lubricated bushing in accordance with the present invention with a top concentric recess visible.
Figure 2:
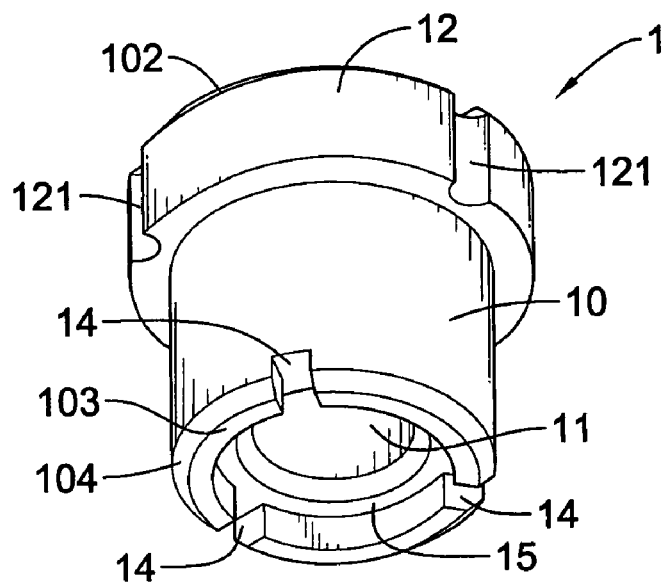
FIG. 2 is another perspective view of the lubricated bushing in FIG. 1 with a bottom concentric recess visible.
Figure 3:
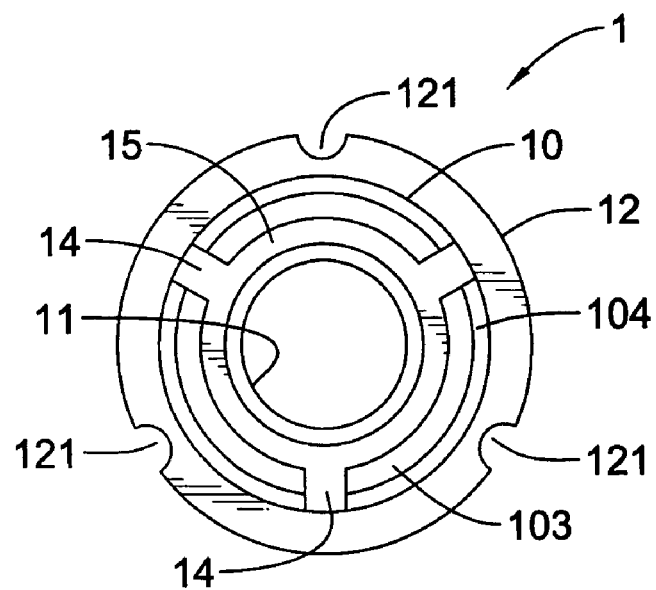
FIG. 3 is a bottom view of the lubricated bushing in FIG. 1.
Figure 4:
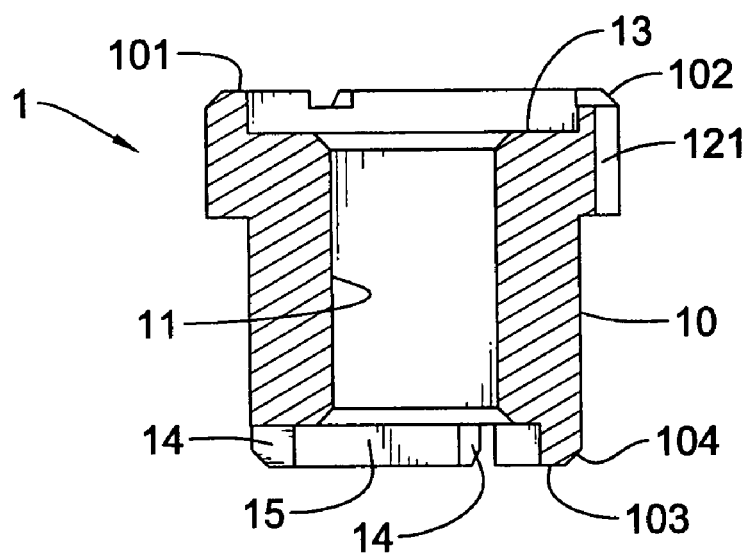
FIG. 4 is a cross-sectional side view of the lubricated bushing in FIG. 1.
Figure 5:
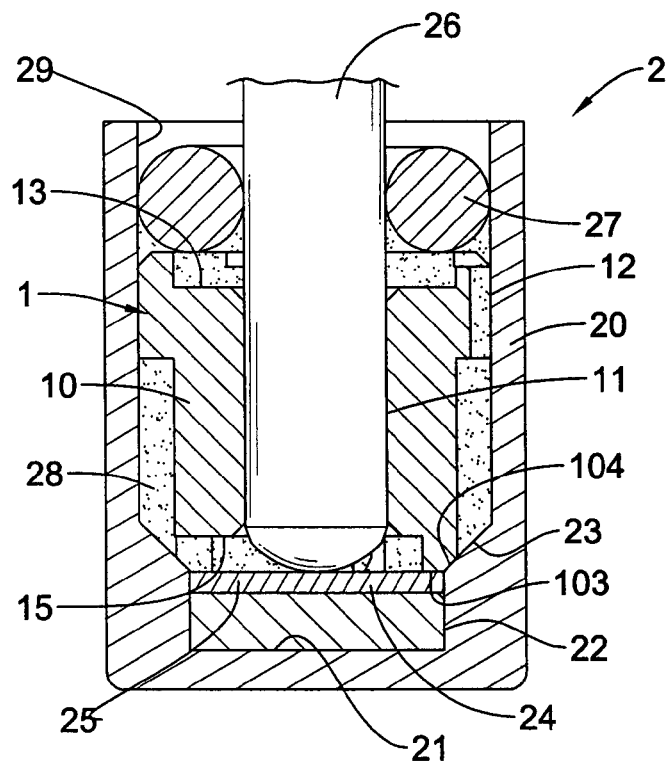
FIG. 5 is a side view in partial section of the lubricated bushing in FIG. 1 mounted in a bushing housing.
Figure 6:
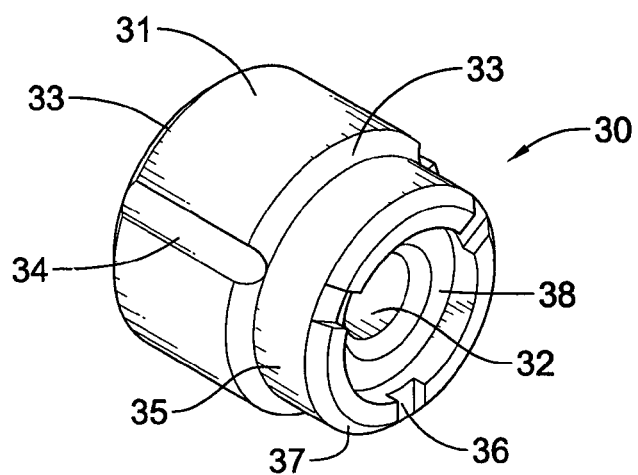
FIG. 6 is a perspective view of a conventional lubricated bushing in accordance with the prior art.

With reference to FIG. 5, a lubricated bushing (1) in accordance with the present invention is mounted in a bushing housing assembly (2) and rotatably holds a shaft (26) of a rotor of a fan.

The bushing housing assembly (2) is mounted in a device such as a fan and has a bushing housing (20), a cushion (24), a base panel (25) and an O-ring (27).

The bushing housing (20) has an open top, a closed bottom, a bottom recess (21) and a mounting cavity (29). The bottom recess (21) is formed in the bushing housing (20) inside the closed bottom. The mounting cavity (29) is formed in the bushing housing (20), communicates with the open top of the bushing housing (20) and the bottom recess (21) and has an inner wall and a beveled shoulder (23). The beveled shoulder

(23) is formed on the inner wall of the mounting cavity (29) between the mounting cavity (29) and the bottom recess (21).

The cushion (24) is mounted in the bottom recess (21) in the bushing housing (20) to absorb vibration when the shaft (26) rotates.

The base panel (25) is made of wear-resistant material and is mounted on the cushion (24) in the bottom recess (21) contact an end of the shaft (26) mounted in the bushing housing (20) and prevent severe wear between the base panel (25) and the bottom end of the shaft (26).

The O-ring (27) is mounted around the shaft (26) in the mounting cavity (29) and abuts the inner wall of the mounting cavity (29) to prevent lubricant in the mounting cavity (29) from leaking out of the bushing housing (20).

With further reference to FIGS. 1-4, the lubricated bushing (1) is mounted in the mounting cavity (29) in the bushing housing (20) and comprises a body (10) and a flange (12).

The body (10) is cylindrical and has a top end, a bottom end (103), an outer wall, an axial hole (11), a bottom concentric recess (15), and multiple lubricant notches (14).

The bottom end (103) of the body (10) has an outer edge and an optional annular chamfer (104). The annular chamfer (104) is formed on the outer edge of the bottom end (103) and abuts the beveled shoulder (23) on the inner wall of the mounting cavity (29) in the bushing housing (20).

The axial hole (11) is formed coaxially through the body (10) to rotatably receive the shaft (26) and has an inner wall.

The bottom concentric recess (15) is formed in the bottom end of the body (10) and communicates with the axial hole (11).

The lubricant notches (14) are formed in the outer edge of the bottom end (103) of the body (10) at intervals, communicate with the bottom concentric recess (15) and may communicate with the annular chamfer (104) in the bottom end (103) to allow lubricant to flow through.

The flange (12) is formed on and protrudes radially out from the outer wall of the body (10) at the top end of body (10), extends longitudinally beyond the top end of the body (10), forms a top concentric recess (13), is shorter than half the body (10) and has a top end (101), an outer wall, an optional end chamfer (102) and multiple lubricant channels (121). The concentric recess (13) communicates with the axial hole (11).

The outer wall of the flange (12) abuts the inner wall of the mounting cavity (29) and forms an annular recess (28) around the outer wall of the body (10) between the flange (12) and the bottom end of the body (10) to store lubricant. This prevents the body (10) from being directly compressed by the inner wall of the mounting cavity (29) and the axial hole (11) is protected from being unexpectedly deformed. Further, because the flange (12) is shorter than half the body (11) and part of the flange (12) is protrudent relative to the top end of the body (11), even though the inner wall of the mounting cavity (29) tightly compresses the flange (12), the compressive force cannot be effectively transmitted to the body (10) to deform the axial hole (11), so the shaft (26) is kept from seizing up in the axial hole (11). Additionally, a loud noise is avoided when the shaft (26) rotates.

The end chamfer (102) is formed on the top end (101) of the flange (12).

The lubricant channels (121) are formed radially in the top end (101) of the flange (12) and longitudinally in the outer wall of the flange (12) at intervals, communicate with the top concentric recess (13) and the annular recess (28), are offset relative to the lubricant notches (14) in the bottom end (103) of the body (10) and may communicate with the end chamfer (102) on the flange (12) to allow lubricant to circulate. When the shaft (26) rotates, lubricant in the top concentric recess (13) flows into the axial hole (11) to reduce friction between the shaft (26) and the inner wall of the axial hole (11) and then flows to the bottom concentric recess (15). Thus, the shaft (26) is protected from severe wear and has a longer life.

Because the lubricant notches (14) do not align with the lubricant channels (121), the lubricant has to flow along an indirect route from the lubricant notches (14) to the lubricant channels (121) and is hard to leak out of the lubricated bushing (1).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lubricated bushing comprising:
   a body being cylindrical and having
      a top end;
      a bottom end having an outer edge;
      an outer wall;
      an axial hole being formed coaxially through the body and having an inner wall;
      a bottom concentric recess being formed in the bottom end of the body and communicating with the axial hole; and
      multiple lubricant notches being formed in the outer edge of the bottom end of the body at intervals and communicating with the bottom concentric recess; and
   a flange being formed on and protruding radially out from the outer wall of the body at the top end of body, extending longitudinally beyond the top end of the body, forming a top concentric recess communicating with the axial hole, being shorter than half the body and having
      a top end;
      an outer wall; and
      multiple lubricant channels being formed radially in the top end of the flange and longitudinally in the outer wall of the flange at intervals, communicating with the top concentric recess and being offset relative to the lubricant notches in the bottom end of the body.

2. The lubricated bushing as claimed in claim 1, wherein the bottom end of the body further has an annular chamfer formed on the outer edge of the bottom end; and
   the lubricant notches communicate with the annular chamfer on the bottom end of the body.

3. The lubricated bushing as claimed in claim 2, wherein the flange further has an end chamfer formed on the top end of the flange; and
   the lubricant channels further communicate with the end chamfer on the flange.

4. The lubricated bushing as claimed in claim 1, wherein the flange further has an end chamfer formed on the top end of the flange; and
   the lubricant channels further communicate with the end chamfer on the flange.

* * * * *